Dec. 2, 1969   W. D. WHITE   3,481,175
METHOD OF FORMING AND PERFORATING A CONTAINER
Filed Jan. 11, 1968   2 Sheets-Sheet 1
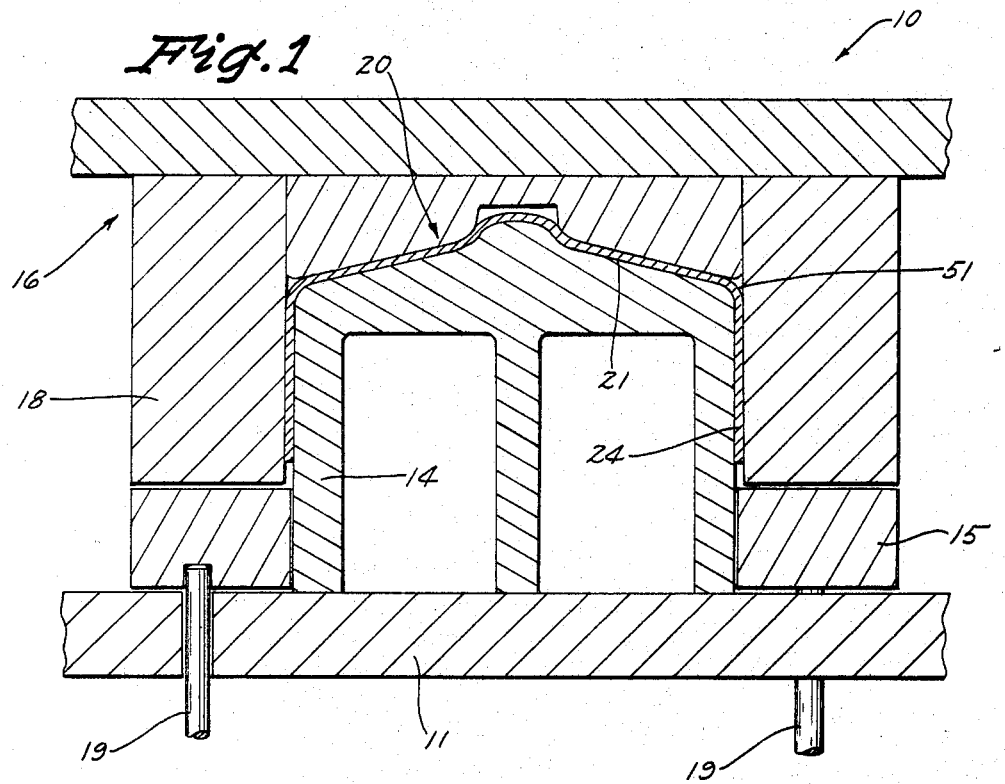
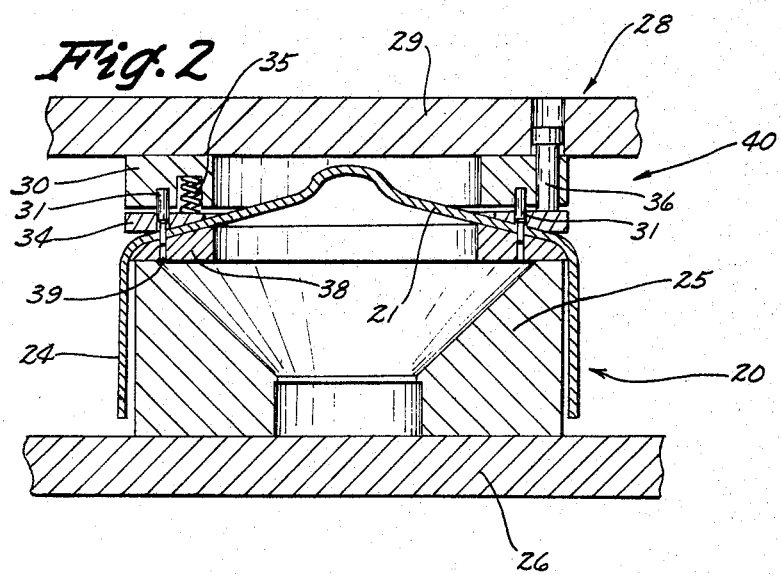
INVENTOR.
WILLIAM D. WHITE
BY
William G. Landwier
AGENT Dec. 2, 1969           W. D. WHITE           3,481,175
METHOD OF FORMING AND PERFORATING A CONTAINER
Filed Jan. 11, 1968           2 Sheets-Sheet 2
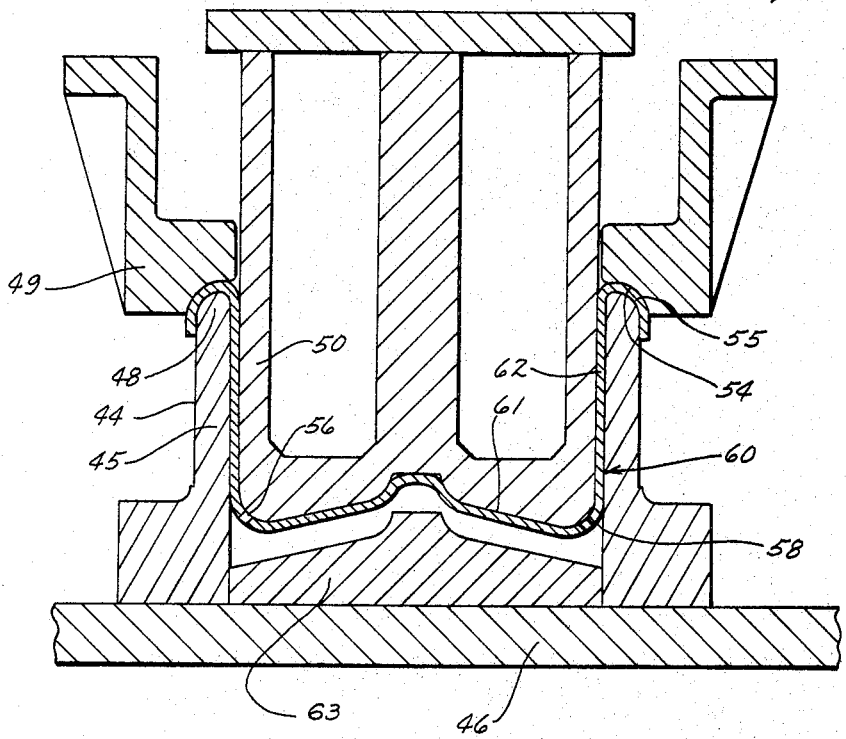
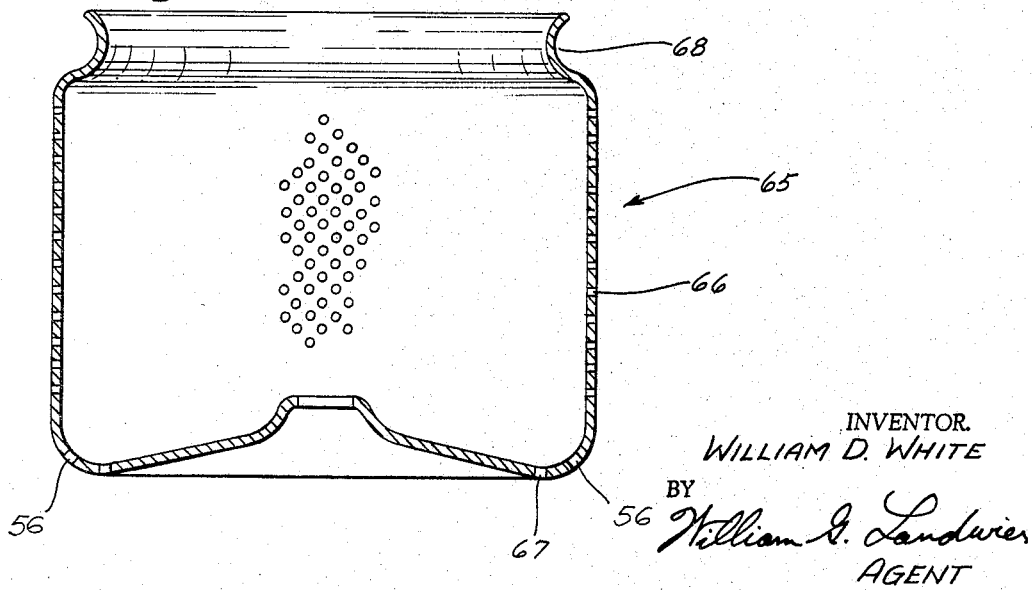
INVENTOR.
WILLIAM D. WHITE
BY
William G. Landwier
AGENT 3,481,175
METHOD OF FORMING AND PERFORATING A CONTAINER
William D. White, Newton, Iowa, assignor to The Maytag Company, Newton, Iowa, a corporation of Delaware
Filed Jan. 11, 1968, Ser. No. 697,140
Int. Cl. B21d 28/28, 22/22
U.S. Cl. 72—333          6 Claims

ABSTRACT OF THE DISCLOSURE

A method of manufacturing a drawn sheet metal cup or container having an opening through the sheet metal at the lower radius between the side and bottom walls comprising drawing a blank into a relatively shallow cup of relatively large diameter, piercing the shallow large diameter cup with an axially directed stroke to form at least one opening in the bottom wall thereof, and reverse drawing the pierced, shallow, large diameter, cup into a deeper cup of reduced diameter and having said opening in an area undergoing the reverse drawing process to displace said opening to a non-axial position.

BACKGROUND OF THE INVENTION

Field of the invention

This invention relates to the art of forming sheet metal and particularly to a process for forming and perforating a cup-like container.

Description of the prior art

It is well known in the drawing art to use the "inside out" or reverse drawing method for forming a relatively deep cylindrical cup-like container. In order to perforate the outer wall of this cylindrical cup-like container, however, it has been necessary to use radially operable punches in conjunction with expensive and relatively slow indexing equipment. If a perforation was desired in the radius at the junction of the sidewall and bottom of the container it would be necessary to use angularly disposed punches or container holding dies combined with the indexing equipment and thus further complicating the manufacturing process.

SUMMARY OF THE INVENTION

It is an object of the present invention to provide an improved method of forming and perforating a deep drawn container.

It is a further object of the present invention to provide an improved method of forming a deep drawn container having non-axially directed perforations in a portion thereof.

It is a further object of the present invention to provide an improved method of working sheet metal including perforating a portion of the drawn container prior to reverse drawing to obtain a deep container having perforations in the portion undergoing the reverse drawing.

It is still a further object of the present invention to provide an improved method of fabricating a container having non-axially directed perforations in the lower junction radius thereof.

The instant invention achieves these objects through a method of working sheet metal including drawing a first shape, such as a relatively shallow, large diameter, container; piercing the first shape and then subjecting the first shape to a reverse drawing to form a second shape, such as a relatively deep, smaller diameter, container having perforations in an outer portion thereof.

Further objects and description of the method and advantages thereof will become evident as the description proceeds and from an examination of the accompanying two pages of drawings which illustrate the preferred embodiment of the invention and in which similar numerals refer to similar parts throughout the several views.

BRIEF DESCRIPTION OF THE DRAWINGS

FIGURE 1 is a more or less diagrammatic sectional view through a portion of a metal working apparatus showing completion of the drawing of a relatively shallow, large diameter container;

FIGURE 2 is a sectional view showing the piercing of the bottom wall of the shallow container;

FIGURE 3 is a similar sectional view showing an intermediate position in the process of reverse drawing the pierced shallow container into a relatively deep container having perforations at the junction radius between the bottom and sidewalls; and FIGURE 4 shows a specific fabric container construction formed by the above method and including additional operations to provide a specific construction useful in a laundry apparatus.

DESCRIPTION OF THE PREFERRED EMBODIMENT

The process or method shown in the drawings is useful in converting a relatively flat blank, previously punched from sheet metal stock, into a relatively deep cup-like perforate container. The blank may be coated with a lubricant to facilitate the drawing operations. Referring to FIGURE 1, there is shown a portion of a press apparatus 10 for performing a first drawing operation on the flat blank (not shown). The apparatus 10 includes a fixed die shoe 11, a draw punch 14 supported by the die shoe 11, a vertically movable annular pressure pad or cushion 15, and a vertically movable draw die assembly 16 including an annular outer portion 18. At the beginning of the operation the pressure pad 15 is positioned adjacent the top portion of the draw punch 14 by axially movable cushion pins 19 for receiving the flat sheet metal blank. Upon actuation of press apparatus 10, the draw die assembly 16 moves downwardly to engage the upper surface of the peripheral portion of the blank and slidingly holds the peripheral portion of the blank between the annular die portion 18 and the annular pressure pad 15. The draw die assembly 16 and the pressure pad 15 continue in a downwardly stroke to form the blank around the draw punch member 14 positioned upon the die shoe 11. The downwardly stroke of the draw die assembly 16 continues until the mating surfaces of the draw punch 14 and draw die assembly 16 form the relatively shallow, large diameter, container 20 having a bottom wall 21 and cylindrical sidewall 24 as shown in FIGURE 1.

Upon completion of the downward stroke, action of the draw die assembly 16 reverses and returns to an upper position spaced from the draw punch 14. The shallow container 20 is then removed from the draw punch 14 and transferred to the apparatus 40 in FIGURE 2 including die holder 25 fixed to the die shoe 26. Positioned above the shallow container 20 is a piercing punch assembly 28 including the punch holder 29, the punch retaining ring 30 holding a plurality of individual piercing punch members 31, and an annular stripper pad 34. The stripper pad 34 is yieldingly supported by a plurality of springs 35 and supporting pins 36 for allowing relative movement between the stripper pad 34 and the piercing punch members 31. At the top of the die holder 25 is a piercing die 38 having openings 39 aligned with the plurality of piercing punch members 31. Upon actuation of the press apparatus 40 of FIGURE 2, the piercing punch assembly 28 will move toward the shallow container 20 and the stripper pad 34 will engage the bottom wall 21 of the container 20. Continued movement of the punch retaining ring 30 and piercing punches 31 downwardly results in the piercing of the bottom wall 21 by the piercing punch members 31 to form a series of perforations in the bottom wall 21. It is thus noted that a series of perforations is placed in the bottom wall 21 of the shallow container 20 through a relatively simple, axially operable, punch and die arrangement. The perforations formed will have an axis generally parallel to the axis of the apparatus 40 and container 20. In this application, the perforations having an axis generally parallel to the axis of the container 20 will be referred to as axially directed or simply as axial perforations.

Following completion of the piercing stroke, the piercing punch assembly 28 will return to an upper position spaced from the bottom of the shallow container 20. This allows the pierced shallow container 20 to be removed from the apparatus 40 of FIGURE 2 and transferred to the apparatus 41 in FIGURE 3.

The shallow container 20 is placed on the outer surface 44 of the upstanding annular reverse draw die 45 in preparation for the reverse drawing of the container. The forming apparatus 41 shown in FIGURE 3 includes a stationary die shoe 46 upon which the annular reverse draw die 45, having an upper annular shoulder 48, is fixed. Further included in the apparatus 41 is a vertically movable blank holder 49 and a vertically movable reverse draw punch 50 cooperable with the annular reverse draw die 45. This forming equipment is used with a double acting press in which the first action is operable for moving the blank holder 49 in a downwardly direction to engage the upper-outer radious 51 of the shallow tub (as in FIGURE 1) in such a manner as to allow sliding movement of the sheet metal between the juxtaposed surfaces 54, 55 of the blank holder 49 and upper annular die shoulder 48. Following the downward movement of the blank holder 49, the second action involves a downward stroke of the reverse draw punch 50 to engage what is the outer surface of the bottom wall 21 of the shallow container 20 as shown in FIGURE 1. Continued downward movement of the reverse draw punch 50 initiates an operation for turning the container 20 inside out or submitting the shallow container 20 to reverse drawing. It is noted that the portion of the shallow container 20 which was pierced in FIGURE 2 is turned upwardly from its downwardly direction and formed about the lower end of the reverse draw punch 50 so that the perforations 56 become located in the junction radius 58 connecting the bottom wall 61 and sidewall 62 of the relatively deep container 60. The axis of the perforations become non-parallel or angularly disposed with respect to the container axis. In this application, the perforations having an axis non-parallel to the container will be referred to as non-axially directed or simply as non-axial perforations. The apparatus in FIGURE 3 is shown at an intermediate position and upon completion of the downward stroke the reverse draw punch 50 will mate with the bottom portion 63 of the reverse draw die 45 to form a relatively deep, smaller diameter, container 60.

It is noted that the reverse drawing process, in this embodiment, includes, first, a relatively small degree of reverse drawing in the area of the perforations to move a portion of the bottom wall 21 from its downwardly direction to an upwardly direction to form the junction radius 58. The second stage of the reverse drawing includes the movement of the sidewall 24 over the annular shoulder 48 of the reverse draw die 45 to effectively turn the container inside out and form sidewall 60 having a smaller diameter than the sidewall 24. It is thus considered that the reverse draw process effects a degree of reversal beginning generally at the point where the first shape remains substantially unchanged through the redraw process. In this embodiment, this point occurs generally at the annular connection between the junction radius 58 and the bottom wall 61 of the container 60.

Tests have shown that the holes 56, previously punched in the operation of FIGURE 2, undergo little distortion during the forming of the metal to the reverse draw punch 50 in the first stage of the reverse draw process.

FIGURE 2 shows the positioning of the holes 56 at a position inwardly disposed from the outermost position of the bottom wall 21 so that the holes 56 become positioned in the junction radius 58; it is recognized, however that the holes 56 may be positioned outwardly a greater extent so that upon the reverse drawing the holes will be positioned in a portion of the cylindrical sidewall 62.

The piercing punches 31 used in this preferred embodiment as shown in the drawings are of circular cross section and uniformly spaced around the annular piercing punch assembly 28; however, it is submitted that size, shape and spacing of the punches and associated dies may be varied to give a desired perforation of the completed container.

FIGURE 4 shows a specific fabric container 65 useful in a laundry apparatus which has been fabricated by a method including the above recited steps and further processed to include additional perforations 66, 67 in side and bottom walls and a rolled neck 68 at the upper portion thereof. The thickness of the sheet metal shown in the drawings has been exaggerated to clairfy the drawings; however, the actual thickness of the specific container 65 shown in FIGURE 4 is .0478 inch. It is recognized that sheet metal of greater or lesser thickness may be drawn into containers of greater or lesser dimensions and perforated by the process disclosed in this application. The openings or perforations 56 formed in the lower radius of the fabric container by this process are valuable in a washing machine fabric container for facilitating more effective removal of sand and other sediment during the centrifugal extraction operation.

It is believed that the process disclosed herein is useful for achieving an improved manufacturing practice having advantages from the standpoint of processing time and tooling cost and thereby contributing to a reduced cost of manufacturing a cup-like container having perforations in a portion of the wall which by other processes would require expensive and time-consuming operations.

In the drawings and specifications, there has been set forth a preferred embodiment of the invention and, although specific terms are employed, these are used in a generic and descriptive sense only and not for purposes of limitation. Changes in form and the proportion of parts as well as the substitution of equivalents are contemplated as circumstances may suggest or render expedient, without departing from the spirit or scope of this invention as further defined in the following claims.

I claim:

1. The method of forming a blank into a shape having at least one opening therein consisting of: drawing said blank into a first shape; piercing said first shape to form at least one opening therein; and reverse drawing said first shape to produce a second shape and to position said opening in an area subjected to said reverse drawing.

2. The method of forming a blank into a shape having at least one opening therein consisting of: drawing said blank into a first shape; piercing said first shape in an axial direction to form at least one opening therein; and reverse drawing said first shape to produce a second shape and to displace said opening to a non-axial orientation in said second shape.

3. The method of forming a blank into a cup-like shape having at least one opening therein consisting of drawing said blank into a first shape; piercing said first shape to form at least one opening therein; and reverse drawing said first shape to produce a second cup-like shape having a substantially cylindrical portion spaced from a central axis and to position said opening in a portion of said second shape so that the axis of said opening is angularly spaced from said central axis.

4. The method of forming and perforating a cup-like container consisting of: forming a blank into a first cup-like container having a central axis; piercing said container to form at least one opening therein having an axis parallel with said central axis; and reverse drawing said first cup-like container into a relatively deeper container of reduced diameter having said opening positioned in said relatively deeper container so that the axis of said opening is angularly spaced from said central axis.

5. The method of forming and perforating a cup-like container consisting of: forming said blank into a first cup-like container having a central axis; piercing the bottom wall of said first cup-like container to form at least one opening therein having an axis parallel to the axis of said first cup-like container; and reverse drawing said first cup-like container into a second cup-like container to position said opening in a portion of said second cup-like container other than said bottom wall.

6. The method of forming a blank into a cup-like container having at least one perforation in the junction radius between the bottom wall and sidewall thereof consisting of: drawing said blank into a first cup-like container; piercing the bottom wall of said first cup-like container at a position spaced radially from the center axis of the cup-like container to form at least one opening in said bottom wall; and reverse drawing said first cup-like container into a second cup-like container having increased depth and decreased diameter for positioning said opening in the junction radius joining the bottom and sidewall of said second cup-like container.

References Cited

UNITED STATES PATENTS

| 1,187,461 | 6/1916 | Knox | 72—349 |
| 2,060,038 | 11/1936 | Christman. | |
| 3,296,850 | 1/1967 | Fiore | 72—351 |
| 2,877,546 | 3/1959 | Wilcox | 72—341 |

FOREIGN PATENTS 498,734   11/1950   Belgium.

RICHARD J. HERBST, Primary Examiner

U.S. Cl. X.R.

72—348